March 11, 1930.  R. C. McALLISTER  1,750,276
COMPRESSOR UNLOADER
Filed Dec. 27, 1927
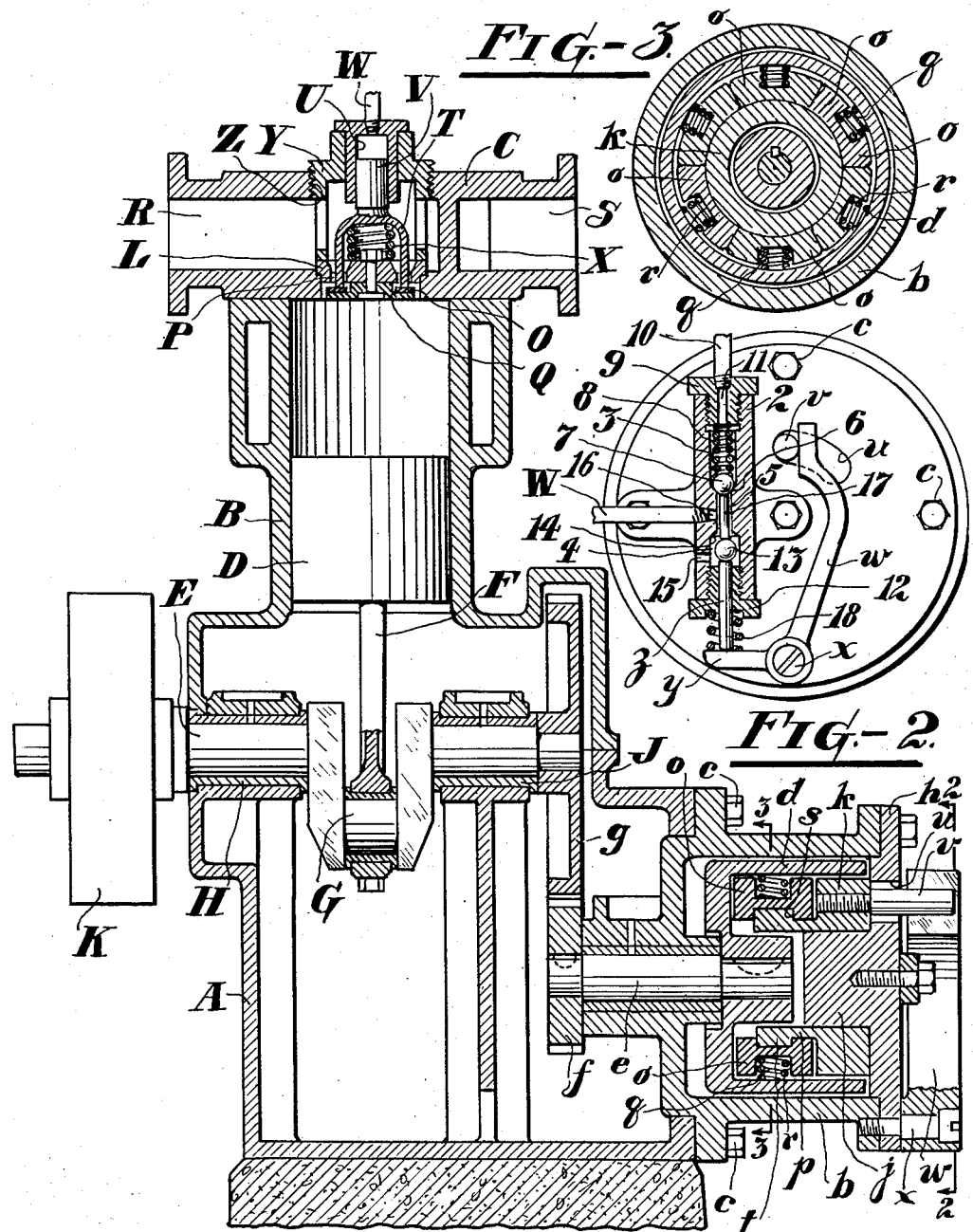
INVENTOR.
Raymond C. McAllister
BY
HIS ATTORNEY Patented Mar. 11, 1930

1,750,276

UNITED STATES PATENT OFFICE

RAYMOND C. McALLISTER, OF PAINTED POST, NEW YORK, ASSIGNOR TO INGERSOLL-RAND COMPANY, OF JERSEY CITY, NEW JERSEY, A CORPORATION OF NEW JERSEY

COMPRESSOR UNLOADER

Application filed December 27, 1927. Serial No. 242,857.

This invention relates to compressor unloaders, and more particularly to unloaders which are adapted to operate to unload the compressor during the starting or stopping period.

One object of the invention is to enable a compressor to be loaded automatically after the starting period without the expenditure of power.

Another object of the invention is to cause the loading of the compressor to be accomplished in a simple and positive manner.

Other objects and advantages of the invention will be in part obvious and in part pointed out hereinafter.

In the drawings forming part of the specification and in which similar reference characters refer to similar parts, Figure 1 is a vertical longitudinal section through a compressor constructed in accordance with the practice of the invention, Figure 2 is an end view of the loading and unloading valve parts being in section to indicate the internal construction, and Figure 3 is a section taken along the line 3—3 of Figure 1 looking in the direction of the arrows.

Referring to the drawings, the invention is shown applied to a compressor having a base A upon which is mounted a cylinder B having a suitable head C. A piston D is adapted to reciprocate within the cylinder B and is driven from a suitable crank shaft E by means of a connecting rod F journalled on a crank pin G. The crank shaft E is journalled as at H and J in the base A and is adapted to be driven by means of an external pulley K mounted on the shaft E. The head C is provided with a suitable valve mechanism for the inlet comprising a valve seat L and a plate valve O for controlling ports P through the valve seat L. The valve O is limited in its movement by the valve seat L and a stop plate Q. The valve O is of the voluntary type, being lifted from its seat by the differential pressures acting on the valve to admit air from a chamber or passage R in the head C to the cylinder B. The exhaust valve for the cylinder B is not shown it being understood that any suitable type of valve for this purpose may be provided to control the flow of air compressed in the cylinder B to an exhaust passage S.

A pneumatic valve lifter means is provided to unseat the valve O which comprises a spider member T having fingers extending through the ports P to press the valve O from its seat L and against the stop plate Q thereby maintaining communication between the inlet passage R of the head C and the interior of the cylinder B. The spider T is adapted to be actuated by compressed air admitted to a cylinder U having a piston V formed integrally with the spider T, a pipe connection W being provided in the cylinder U to admit such compressed air. Normally the spider T is maintained out of contact with the valve O by means of a suitable coil spring X inserted within the spider T and bearing against the valve seat L. The valve O and cylinder U are suitably maintained in position in the cylinder head C by a cage Y screwed firmly into an aperture Z at the inlet passage R of the head.

In operating compressors of any type, a relatively great amount of power is required to start the compressor especially if motor driven and it is generally considered advisable to remove as much of the load as possible from the motor during its acceleration period. It is considered desirable, therefore, to unload the compressor during its acceleration period by opening the admission valve O which is accomplished by admitting motive fluid to the cylinder U thereby causing the spider T to depress or lift the valve O from its seat L. To this end, the invention provides a device which is adapted to supply motive fluid to the cylinder U only during the part of the accelerating period or while the compressor is coming up to speed. A casing $b$ is suitably bolted as by means of a cap screw $c$ to the base A and is adapted to house a hollow cup shaped member $d$ driven by the compressor through a shaft $e$ journalled in the casing $b$ and keyed to the member $d$. The shaft $e$ extends into the compressor base A and is provided at its inner end with a gear $f$ meshing with a relatively large gear $g$ mounted on the end of the crank shaft E. The casing b has a cover member h which is bolted or otherwise suitably attached to inclose the outer end of the casing b. The cover h is provided with a central cylindrical boss j on which is rotatably mounted a rotatable portion k within the cup shaped member d. Frictional engagement between the rotatable portion k and the cup shaped member d is provided by a plurality of weights o encircling a reduced end portion p of the rotatable portion k, the weights o being pressed thereon by coil springs q inserted in apertures r in the weights o and pressing against the interior surface of the cup shaped member d. The weights o are kept from longitudinal movement with respect to the rotatable portion k by the provision of a groove s on the inner face of the weights which is adapted to cooperate with a rib t on the rotatable portion k. Thus as the cup shaped member d rotates, the weights o are adapted to rotate therewith. The degree of frictional engagement with the weights o and the rotatable portion k is dependable upon the speed of rotation of the weights.

As will be understood the centrifugal force acting on the weights o will be sufficient at high speed of the cup shaped member d to overcome the force of the coil springs q and to expand the ring of weights o by retracting them toward the member d thereby disengaging the rotatable portion k.

An aperture u is provided in the face of the cover h through which a finger v is adapted to extend to engage a lever w mounted pivotally on a cap screw x of the cover h. The lever w is arranged to engage at its short end y a stem z of a pneumatic controlling valve comprising a casing or body member 2 having two relatively large bores 3 and 4 connected by a smaller bore 5. The bore 3 at its junction with the bore 5 is provided with a seat 6 for a ball valve 7 normally pressed to its seat by a coil spring 8 within the bore 3. The end of the bore 3 is provided with a plug 9 connected to a suitable source of motive fluid such as compressed air by a pipe 10 inserted in a threaded aperture 11. The end of the bore 4 is provided with a cap 12 through which the stem z extends longitudinally to actuate a ball valve 13 in the bore 4 and adapted to cooperate with a seat 14 at the junction of the bore 4 and the bore 5. The bore 4 is connected to atmosphere for exhaust purposes by a port 15. This valve is adapted to control the supply of motive fluid to the cylinder U and the exhaust therefrom. The pipe W is accordingly connected at an aperture 16 in the body 2 and leads to the bore 5. Within the bore 5 there is provided a rod 17 of such length that the valves 7 and 13 cannot both be seated at the same time. Normally the valve 7 is kept seated by the spring 8 pressing directly thereagainst and a coil spring 18 about the stem z pressing against the end y of the lever w.

The operation of the device is as follows: At slow speeds of the shaft E, the cup shaped member d is rotated slowly by means of the shaft e and the gears f and g. The spring pressed weights o are rotated with the member d and grip the rotatable portion k. The movement of the rotatable portion k is limited partly by the length of the aperture u and the movement of the lever w, the finger v being moved with the rotatable portion k presses against the lever w and the shorter end y of the lever w presses against the stem z of the controlling valve overcoming the force of the springs 8 and 18 and pushing the ball valve 13 to its seat 14. The ball valve 13 presses against the rod 17 unseating the valve 7 permitting motive fluid to flow from the pipe 10 through the bores 3 and 5 to the pipe W thereby filling the cylinder U with air under pressure. The piston B is depressed causing the spider T to press the valve O from its seat and holding it against the back stop Q. The admission valve ports p being opened in this position of the valve O, air is pumped in and out of the cylinder B without the expenditure of any considerable power.

At an increase of speed of rotation of the drive shaft E and the correspondingly greater speed of the cup shaped member d, the weights o being acted upon by the increased centrifugal force to overcome the pressure of the spring q thereby disengaging the rotatable portion k which then returns to its original position by virtue of the tension in the springs 8 and 18 against the lever w. The spring 8 presses the ball valve 7 to its seat shutting off the supply of motive fluid from the pipe 10. Simultaneously the ball valve 7 presses the ball valve 13 from its seat by means of the rod 17 permitting the air or other motive fluid under pressure in the cylinder U to escape to atmosphere through the pipe W, the bore 5 past the valve seat 14 into the bore 4 and out through the atmospheric port 15. The time of loading of the compressor is controlled and governed by the tension of the springs q. Usually it is not necessary to keep the compressor unloaded until the crank shaft E has reached its maximum speed and therefore relatively light springs q may be provided, their tension being merely sufficient to produce a gripping action between the weights o and the rotatable portion k to overcome the tension of the springs 8 and 18 for a relatively short period during the starting of the driving motor (not shown) of the compressor.

Thus by the above construction are accomplished among others the objects hereinbefore referred to.

I claim:

1. The combination with a compressor of a member driven by the compressor, spring pressed weights adapted to rotate with said member, a rotatable portion having a limited movement and adapted to be frictionally gripped by said weights and released therefrom by the centrifugal force acting on the weights, and a pneumatic controlling valve adapted to be actuated by said rotatable portion, said compressor having an inlet valve adapted to be controlled by said controlling valve.

2. The combination with a compressor and its inlet valve, of a rotating member driven by the compressor, spring pressed weights adapted to rotate with said member and driven thereby, a rotatable portion having limited rotational movement and adapted to be frictionally gripped by said rotating weights and released therefrom by centrifugal force acting on said weights, an inlet valve in the compressor, pneumatic valve lifter means for the inlet valve, and a controlling valve adapted to be actuated by said rotatable portion to supply motive fluid to said valve lifter means.

3. The combination with a compressor and its inlet valve, of a member driven by the compressor, spring pressed weights adapted to rotate with said member, a rotatable portion having limited movement and adapted to be frictionally gripped by said rotating weights and released therefrom by centrifugal force acting on said weights, a lever adapted to be actuated by said rotatable portion, a pneumatic controlling valve cooperating with said lever to be actuated by said rotatable portion, and pneumatic valve lifter means for the inlet valve adapted to be controlled by said valve.

4. The combination with a compressor and its inlet valve, of a hollow cup member driven by the compressor, spring pressed weights within said cup member, a rotatable portion within said cup member encircled by said weights and adapted to be frictionally gripped thereby and released therefrom by centrifugal force acting on said weights, a finger projecting outwardly from said rotatable portion and adapted to limit the movement of said rotatable portion, a lever adapted to be engaged by said finger, a pneumatically actuated valve lifter for the inlet valve, and a valve for controlling said valve lifter adapted to be actuated by said lever.

5. The combination with a compressor and its inlet valve, of a casing, a hollow cup member rotatable within said casing and adapted to be driven by the compressor, spring pressed weights adapted to rotate with said cup member, a cover having an aperture therethrough and secured to said casing, a rotatable portion journalled on said cover and extending into said cup member, said portion being encircled by and adapted to be frictionally gripped by said rotating weights and released therefrom by centrifugal force acting on said weights, a finger on said portion extending through the aperture in said cover and limiting the rotative movement of said portion, a lever pivoted on said cover adapted to be actuated by said finger, a pneumatic valve lifter for opening the inlet valve, and a pneumatic valve operable by said lever for controlling the flow of motive fluid to said valve lifter.

6. The combination with a compressor and its inlet valve, of a member adapted to be rotated by the compressor, a second member mounted for limited pivot movement adjacent said first member, frictional means disposed between said members, said means being capable of retraction from said pivoted member by centrifugal action when said first mentioned member attains a predetermined speed of rotation, said pivoted member having engagement with a valve controlling lever whereby at low compressor speeds said lever will be thrown in one direction and at high speeds said lever will be retracted, a pneumatic controlling valve adapted to be actuated by said lever, and a pneumatic valve lifter for the inlet valve connected to the said pneumatic controlling valve.

In testimony whereof I have signed this specification.

RAYMOND C. McALLISTER.